(12) United States Patent
Genc et al.

(10) Patent No.: US 8,885,884 B2
(45) Date of Patent: Nov. 11, 2014

(54) MOTION ANALYSIS THROUGH GEOMETRY CORRECTION AND WARPING

(75) Inventors: Yakup Genc, Dayton, NJ (US); Gang Li, Princeton, NJ (US); Clifford Hatcher, Jr., Orlando, FL (US)

(73) Assignees: Siemens Corporation, Iselin, NJ (US); Siemens Energy, Inc., Orlando, FL (US)

( * ) Notice: Subject to any disclaimer, the term of this patent is extended or adjusted under 35 U.S.C. 154(b) by 230 days.

(21) Appl. No.: 13/584,887

(22) Filed: Aug. 14, 2012

(65) Prior Publication Data

US 2013/0070967 A1 Mar. 21, 2013

Related U.S. Application Data (60) Provisional application No. 61/536,255, filed on Sep. 19, 2011.

(51) Int. Cl.
*G06K 9/00* (2006.01)
*G06T 7/20* (2006.01)

(52) U.S. Cl.
CPC ......... *G06T 7/20* (2013.01); *G06T 2207/30164* (2013.01); *G06T 2207/10016* (2013.01)
USPC ............ 382/103; 382/154; 382/293; 382/107

(58) Field of Classification Search
CPC ..................... G06T 19/00; G06T 2207/20124; G06T 3/0093; G06T 7/20; G06T 15/00; G06K 9/00214; G06K 9/00201
USPC .................................. 382/103, 154, 107, 293
See application file for complete search history.

(56) References Cited

U.S. PATENT DOCUMENTS

| | | | |
|---|---|---|---|
| 2007/0177160 A1* | 8/2007 | Sasaki | 356/603 |
| 2007/0206204 A1* | 9/2007 | Jia et al. | 356/604 |
| 2010/0056919 A1* | 3/2010 | Abe | 600/443 |
| 2010/0183192 A1 | 7/2010 | Fritsch et al. | |
| 2010/0315505 A1* | 12/2010 | Michalke et al. | 348/118 |
| 2011/0009992 A1* | 1/2011 | Shkolnik et al. | 700/97 |

OTHER PUBLICATIONS

PCT International Search Report mailed Nov. 22, 2012 corresponding to PCT International Application No. PCT/US2012/052193 filed Aug. 24, 2012 (9 pages).
"Dynamic 3-D Shape Measurement Method: A Review"; Su, X., et al.; Optics and Lasers in Engineering, Elsevier, Amsterdam, NJ, vol. 48, No. 2; pp. 191-204; XP026780214; 2010; NL; Feb. 1, 2010.

\* cited by examiner

*Primary Examiner* — Stephen R Koziol
*Assistant Examiner* — Shaghayegh Azima (57) ABSTRACT

An object in a hot atmosphere with a temperature greater than 400 F in a gas turbine moves in a 3D space. The movement may include a vibrational movement. The movement includes a rotational movement about an axis and a translational movement along the axis. Images of the object are recorded with a camera, which may be a high-speed camera. The object is provided with a pattern that is tracked in images. Warpings of sub-patches in a reference image of the object are determined to form standard format warped areas. The warpings are applied piece-wise to areas in following images to create corrected images. Standard tracking such as SSD tracking is applied to the piece-wise corrected images to determine a movement of the object. The image correction and object tracking are performed by a processor.

20 Claims, 13 Drawing Sheets

MOTION ANALYSIS THROUGH GEOMETRY CORRECTION AND WARPING

STATEMENT OF RELATED CASES

The present application claims priority to and the benefit of U.S. Provisional Patent Application Ser. No. 61/536,255 filed on Sep. 19, 2011, which is fully incorporated herein by reference.

TECHNICAL FIELD

The present invention relates to image based non-contact measurement of movements of objects in a turbine at temperatures of 400 F and higher.

BACKGROUND

It is useful to monitor vibrational behavior of parts of gas turbines such as used for generating electricity during operation. Internal parts of turbines operate at temperatures well above room temperature. Also, major areas of a turbine are not easily accessible for sensors such as accelerometers during operation. Non-contact measurement solutions for monitoring vibrational behavior of turbine parts during operation are preferred.

It is believed that currently no camera based systems or methods are available to provide images of specific parts of a turbine to enable accurate analysis of high frequency vibrations in a 3D space of such parts.

Accordingly, improved and novel camera based methods and systems are required to record an image of a part of a turbine in operation that moves in a 3D space and that allows accurate movement analysis.

SUMMARY

Methods to track a 3D object n a plurality of images are provided. In accordance with an aspect the present invention, a method can include the steps of providing a predetermined pattern on the 3D object, identifying a patch containing at least part of the predetermined pattern on the 3D object in a reference image in the plurality of images, determining a plurality of sub-patches in the patch, for each of the plurality of sub-patches in the patch, warping a captured part of the predetermined pattern to a standard format age shape, determining an image area inside the patch in a second image, applying by a processor of the warping to image data of the second image inside the patch; and the processor determining a movement of the 3D object from the reference image and the second image.

In accordance with a further aspect of the present invention, the method above can include the step of determining the movement by applying Sum of Square Difference (SSD) tracking to the reference and second images.

In accordance with another aspect of the present invention, the 3D object is part of a turbine moving in an atmosphere with a temperature greater than 400 degrees F.

In accordance with yet a further aspect of the present invention, the predetermined pattern is a checkerboard pattern. Also, the standard format image shape can be a square. The patch can cover about 3600 pixels.

In accordance with another aspect of the invention, the movement of the 3D object includes a vibrational movement of a frequency greater than 100 Hz.

In accordance with another aspect of the invention, the 3D object experiences a circumferential movement about an axis and a translational movement along the axis.

In accordance with another aspect of the invention, the plurality of images can be generated with an infra-red image sensor.

In accordance with another aspect of the invention, a warping can be determined by a 2×2 projective transformation of each image element in a sub-patch to an image element in a corrected image.

In accordance with another aspect of the present invention, a system to perform the steps described herein is also provided. The system includes a memory enabled to store data including instructions and a processor enabled to execute instructions to perform the steps described herein:

DESCRIPTION

In accordance with an aspect of the present invention independent 2D and 3D motions of at least one engine part in a turbine in operation is monitored and analyzed from video images. The video images are captured with a video camera. In one embodiment of the present invention a part has movements inside a warm or hot part of a turbine with a temperature of over 300 degrees F., or even over 400 degrees F., or even over 500 degrees F. or even over 600 degrees F.

In a further embodiment of the present invention the movements of the parts include vibrations. The vibrations may have a frequency component of less than 100 Hz. The vibrations may have a frequency component of 100 Hz or higher. A frequency component may be in a range of up to 300 Hz. In one embodiment of the present invention the video camera to record movements of the at least one part in a relatively high temperature part of a turbine is a high speed camera with an infra-red (IR) image sensor and recording at a high frame rate of for instance 2000 frames per second. In a further embodiment of the present invention 2D and 3D motions of at least two engine parts in a turbine are analyzed.

The problem is difficult because engine parts perform independent motions and are affected by an unknown motion of the base they are attached to. So the observed image motion of the object is a combination of the unknown motion of the base and individual engine part motion. Furthermore, there is a haze effect caused by the hot air in the surrounding area. This haze causes different optical effects on the part, and is assumed to be constant over at least a small part of the object or a small patch of the image of the object. In accordance with one aspect of the present invention methods and systems are provided to analyze only the individual motion of one or more engine parts in a turbine which may be a high frequency motion with a relatively high temperature compared to room temperature by using a high speed camera.

Figure 1:
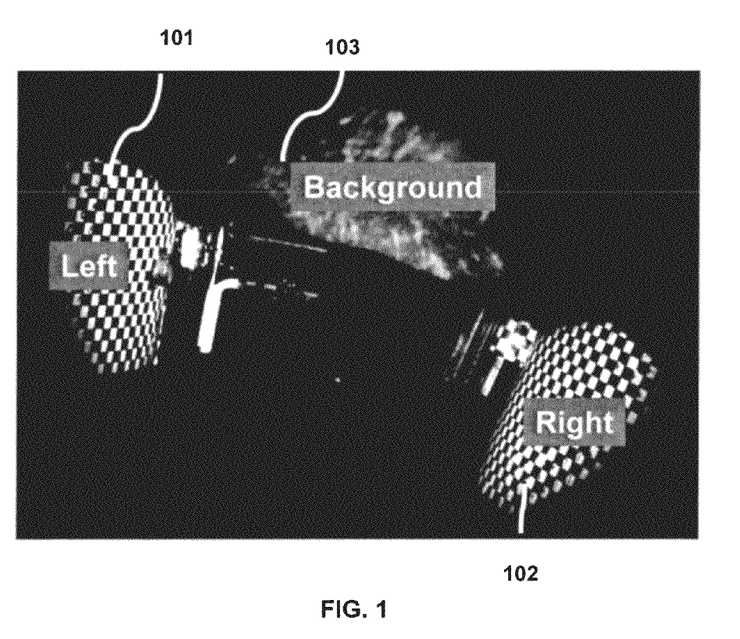
FIGS. 1 and 2 illustrate an image by a camera of two moving machine parts and a background in accordance with an aspect of the present invention.
Figure 2:
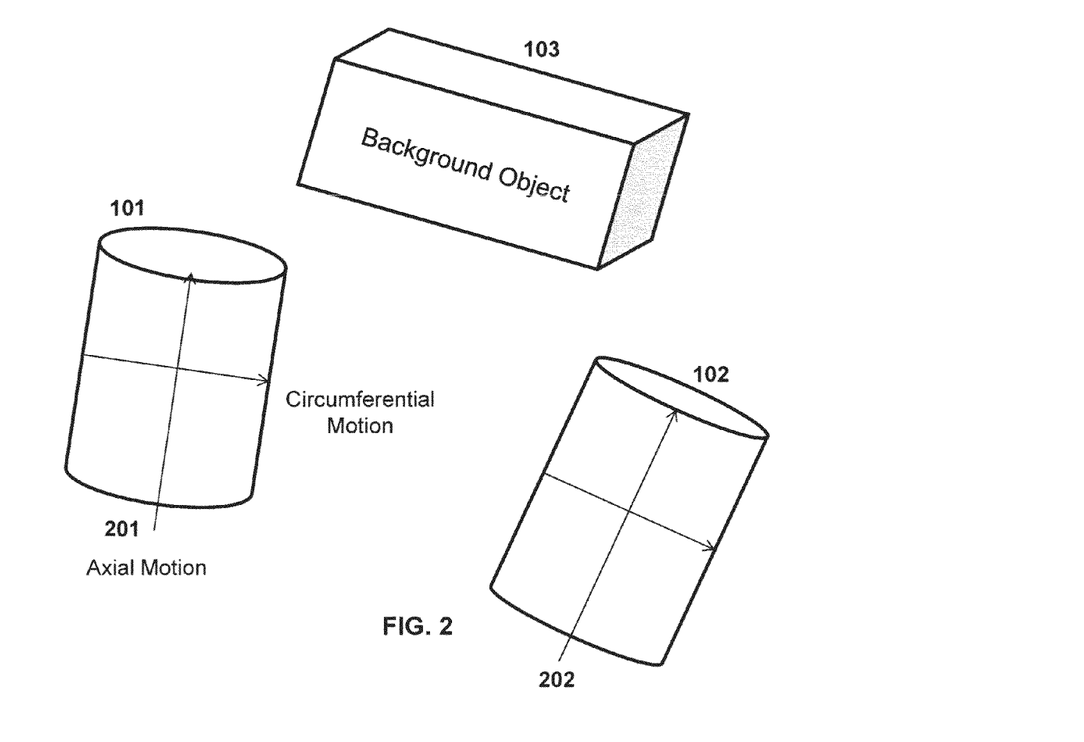

FIG. 1 shows one configuration of the set up in a sample image and FIG. 2 illustrates the one configuration of the set-up in a diagram. Two engine parts 101 and 102 are being tracked and their movements analyzed. The two engine parts may move independent of a third part 103 or may be attached to a third engine part 103 which may be the engine frame. The camera to record the engine parts 101 and/or 102 may be attached to the frame 103 or may be independent of base or frame 103. In order to facilitate the analysis of movement of 101 and/or 102 these part are covered with a distinguishing pattern. In one embodiment of the present invention the pattern is a checkerboard pattern of squares with different distinguishable colors. The size of the pattern is selected in such a way that it enables sufficient detection of expected motion. In one embodiment of the present invention some or all squares are provided with distinguishing marks that enable automatic location and tracking.

The movement of parts 101 and 102 can be any movement but for the purpose of an example analysis are assumed to be an axial movement along an axis and a circumferential or rotational movement about the axis 201 and 202. Images taken with the camera are 2D images. The rotational and axial movement of the objects 101 and 102 thus appear to be a translational movement of the checkerboard pattern in the 2D image, A movement of the objects in a z direction (perpendicular to the screen or the image plane) will create a change in size of the checkerboard elements.

Unless the checkerboard pattern lies in the image plane and the movement of the object is in the image plane, the checkerboard pattern will be distorted due to projection distortion and may be further distorted when the object rotates about its axis.

Figure 3:
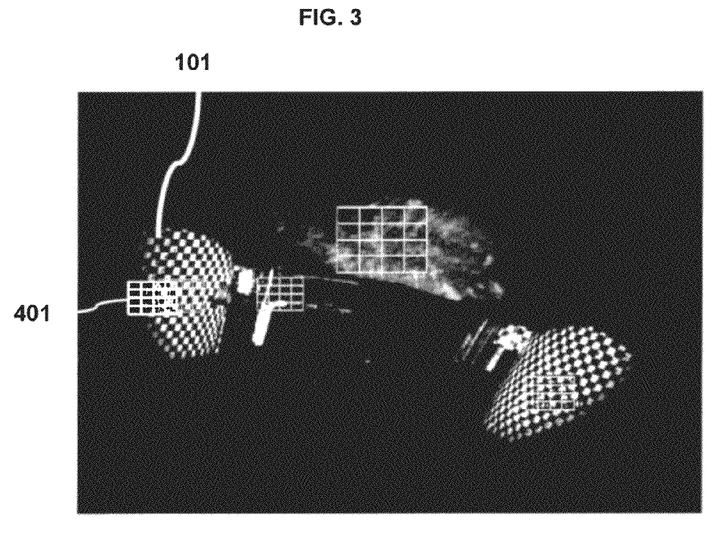
FIG. 3 illustrates tracking patches on a machine part to track movement in accordance with an aspect of the present invention.

What one would like to achieve is to follow or track a movement of an object with a pattern, for instance a checkerboard pattern, by consecutive images wherein a rotational movement about an axis and/or a movement along the axis shows up as a translational movement in a 2D plane. For instance a small movement (rotational and/or translational) of a square 301 in the pattern on an object will show up as the square in a new position 302 moved along a vector $s_{xy}$ in x and y direction.

Thus a 2D translational motion model is assumed and an object is tracked by tracking image-to-image translational movement of patches in the checkerboard pattern on the objects. This is illustrated in FIG. 3 for an image including machine part 101 with 9 overlapping patches 401. Each patch contains 4 rectangles and the overlap with a next patch is 1 rectangle.

Figure 4:
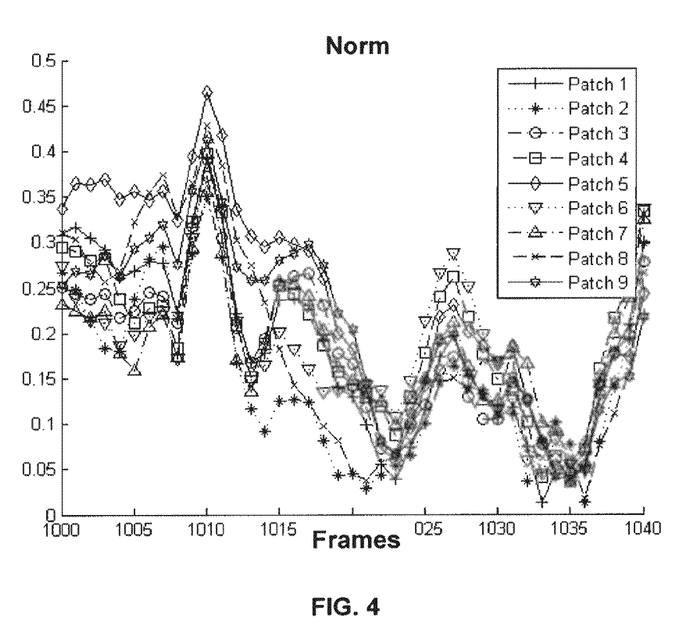
FIG. 4 illustrates patch movement in an image in accordance with an aspect of the present invention.

The 9 partially overlapping patches are tracked individually by applying a standard Sum of Square Difference (SSD) tracking technique. A motion vector of a center window is compared with an average of motion vectors of surrounding 8 windows. The consistency of motion vectors is checked. Because the patches are all on a single object they should show consistent motion. The norm of motion vectors from different patches in 401 on part 101 is illustrated in FIG. 4 wherein on the horizontal axis the frame numbers are provided and the vertical axis indicates the norm of the motion vectors. One can notice large variance in the norm of the motion vector in FIG. 4 suggesting that the tracking is location sensitive and therefore in the form as reflected in FIG. 4 is not reliable.

There are at least two effects that distort the tracking of the 3D part in a 2D image: a) the projective distortion and b) heat (or haze) related distortion. The recorded image $\hat{f}$ is a result of $\hat{f}=f_O+f_{PR}$ wherein $f_O$ reflects an optical distortion due to heat and haze and $f_{PR}$ reflects the projection distortion. The optical distortion is created and influenced by the motion of the warm and hot air and/or gases in the turbine and will be considered to be relatively consistent over only a small area. The projection distortion depends on the shape of the object. Accordingly, the recorded image and the distortion of the image compared to the original pattern in 3D space is at least location dependent.

In accordance with an aspect of the present invention knowledge of the real shape and size of a pattern on the object that is tracked in 3D space is applied to track movement of the object over time by analyzing images of the object taken from the image as it moves in 3D space. In accordance with an aspect of the present invention, in an image at least one element of a pattern placed on an object wherein the image of the element appears as distorted is warped to a standard format. An expectation is that different patches on the object in the image that are warped to the standard format will show a consistent movement relative to each other, thus providing a reliable non-contact monitoring method for tracking an engine part in a hot atmosphere in a machine such as a turbine.

In accordance with an aspect of the present invention tracking of an object in an image experiencing at least projection distortion in the image is achieved by applying the following steps:

(1) Provide the object with a pattern;
(2) Rectify input image (for each object) with piecewise warping; and
(3) Track multiple (partially overlapping) windows independently.

In order to check the viability of the above approach one can validate by (4)

Compare the motion vectors and check their consistency.

The checkerboard pattern on the engine part as shown for example in FIG. 1 has black and white squares with a known size (e.g. 3.818 mm×3.818 mm). In one embodiment of the present invention the pattern has squares in which a side of the square of a pattern that is subject to the methods described herein is equal or greater than 3 mm. In one embodiment of the present invention the pattern has squares in which a side of the square of a pattern that is subject to the methods described herein is smaller than 3 mm. In one embodiment of the present invention the pattern has elements with a surface each that is subject to the methods described herein and the surface is smaller than 9 mm$^2$. In one embodiment of the present invention the pattern has elements with a surface each that is subject to the methods described herein and the surface is equal or greater than 9 mm$^2$. In one embodiment of the present invention the pattern has rectangles in which all rectangles that share a side have different colors. It is noted that other patterns are also possible and can be used to track an object. One goal is to measure metric motion in the axial and circumferential directions of a cylindrical engine part. For this purpose the checkerboard pattern is used as an illustrative example.

In accordance with one aspect of the present invention, a region of interest (ROI) in each image is warped to a canonical template. Specifically, because of the checkerboard pattern, four corners of a square region are selected in the input image and mapped to a square in the geometry-corrected image. Since the engine part is a cylindrical object, there are two solutions for geometry correction:

(1) One can use the physical model (e.g. CAD) of the cylindrical engine part and derive the geometry correction mapping;
(2) One can select small regions from the input image and map them to the corresponding locations (four corners of a square) in the geometry corrected image using a 2×2 projective transformation $P_i$. For every scene point X on the planar surface (checkerboard), its imaged point in the image u can be linearly mapped to a point û of a canonical image square.

Since the engine part is not planar, such transformation is only applied to a small region where such linear mapping is a good approximation. As a result, a piecewise warping is achieved for the geometry correction step. This warping also corrects for the (local) effect of hot gasses.

$$\hat{u} = P_i u = \begin{bmatrix} p_{i11} & p_{i12} \\ p_{i21} & p_{i22} \end{bmatrix} \begin{bmatrix} u \\ v \end{bmatrix} \qquad (1)$$

In one embodiment of the present invention, the second approach was implemented on a processor to obtain the piecewise warping for the geometry correction. A set of 4×5=20 piecewise warpings was used and each one is determined only once for a reference image. Then each input image will be geometrically corrected using a piecewise warping.

The canonical image template is designed to be of similar resolution (20×20 pixels were used for each square) as in raw images so that motion information is best retained. In accordance with an aspect of the present invention a warped image of an element of a pattern element is a square with about 400 pixels. The term "about 400 pixels" herein means a size of not less than 350 pixels and not more than 450 pixels. Motion tracking is performed on geometry corrected image sequence. Metric motion is then easily obtained from the image motion vectors in the geometry corrected images.

Patch Size and Motion Range

To decide a patch size for object tracking in the above approach, there is a trade-off: larger patch will usually produce smoother tracking result but can lose tracking accuracy for localization, while smaller patch size can provide better accuracy for localization but can fail due to insufficient contrast in the window. It was empirically decided that a patch size of 60×60 pixels provided a good balance between accuracy and reliability for this example of FIG. 1 and the experienced movement as illustrated in the graphs of FIG. 4. In accordance with an aspect of the present invention a patch includes about 3600 pixels. About 3600 pixels herein include not less than 3200 pixels and not more than 4000 pixels.

Furthermore, several overlapping windows (e.g. 9) were again applied and their tracking results using the piecewise warping were analyzed. Their motion patterns prove to be consistent both in Euclidean space as well as in frequency domain and thus prove the above approach to be valid. By using several overlapping windows the potential erroneous motion estimates caused by image noise were eliminated.

Figure 5:
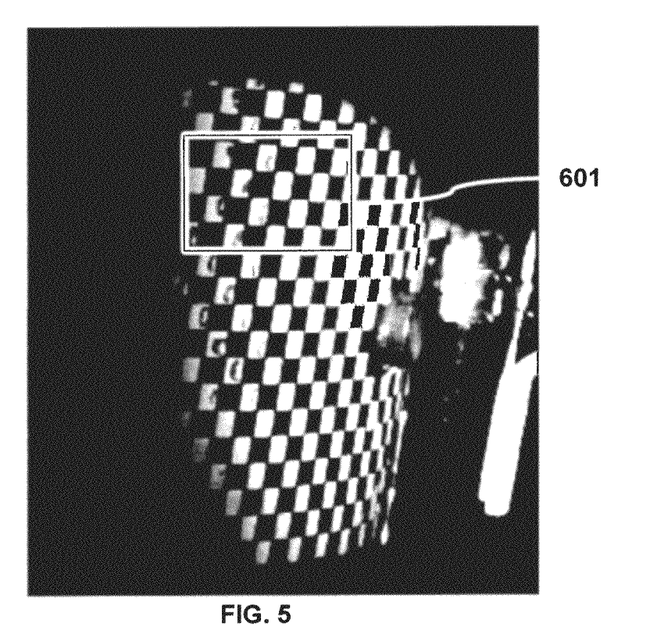
FIG. 5 illustrates an image of a machine part and a location wherein image warping will be applied.
Figure 6:
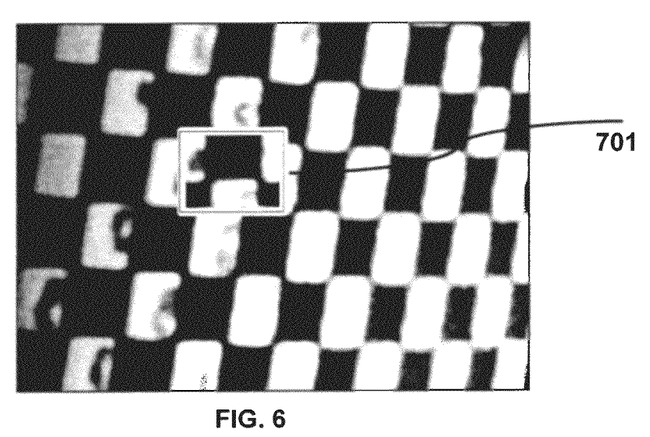
FIGS. 6-11 illustrate image warping in accordance with various aspects of the present invention.

FIG. 6 is an image of the left engine part 101 of FIG. 1. FIG. 5 may be considered raw input. Further identified is an area 601 in which patches will be tracked and wherein warping of sub-areas will take place to achieve the approach as described above.

Figure 7:
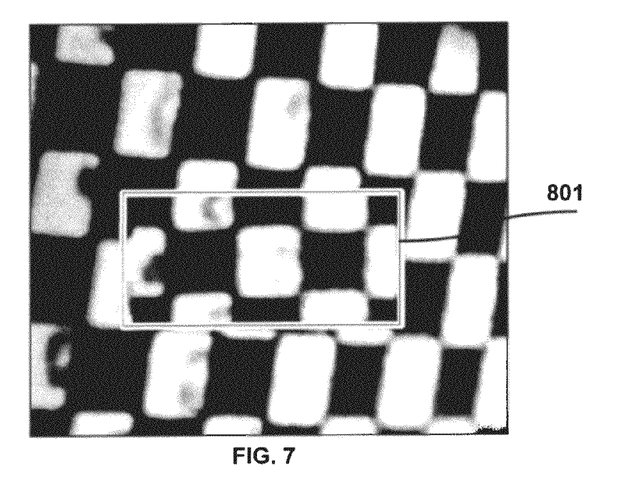
Figure 8:
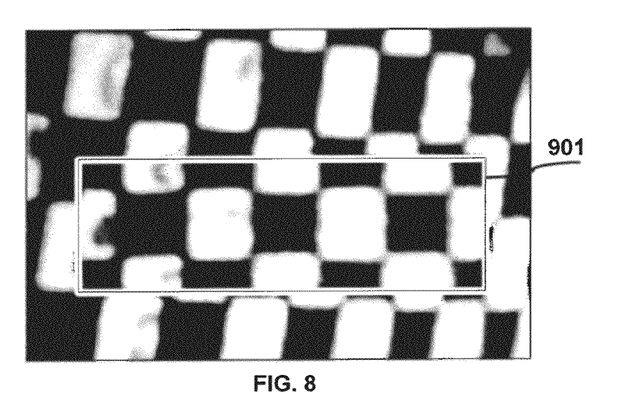
Figure 9:
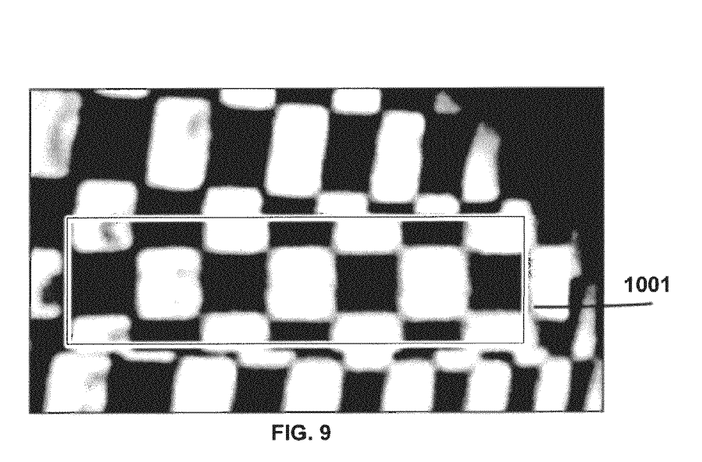
Figure 10:
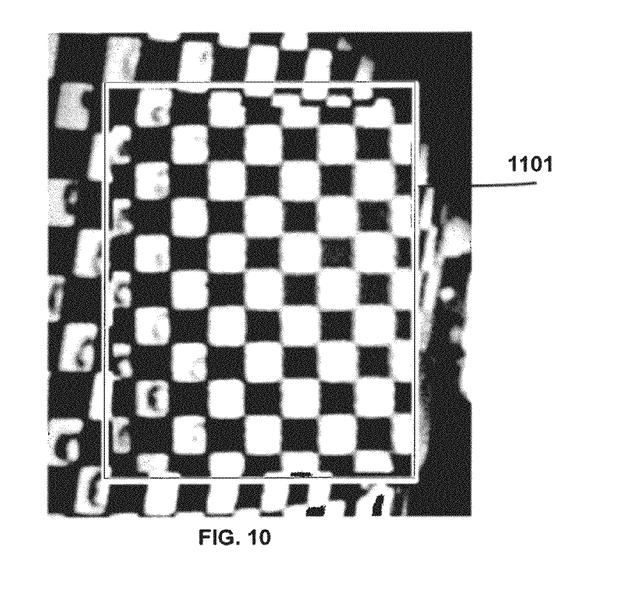

FIG. 6 illustrates the image area 601 with sub-part 701 which is the piecewise warped first sub-patch. FIG. 7 illustrates the image area 601 with sub-part 801 which is the piecewise warped second sub-patch. FIG. 8 illustrates the image area 601 with sub-part 901 which is the piecewise warped third sub-patch. FIG. 9 illustrates the image area 601 with sub-part 1001 which is the piecewise warped fourth sub-patch. FIG. 10 illustrates the image part 1101 with all piecewise warpings for the patch.

One can see in FIGS. 6-10 that each sub-patch is rectified by an (affine) warping that creates square patterns. The patterns inside boxes 701, 801, 901, 1001 and 1101 are squares, while the checkered pattern outside these boxes is clearly slanted with a more elongated shape rather than square. Accordingly and in accordance with an aspect of the present invention a warping is determined by a 2×2 projective transformation of each image element in a sub-patch to an image element in a corrected image.

Figure 11:
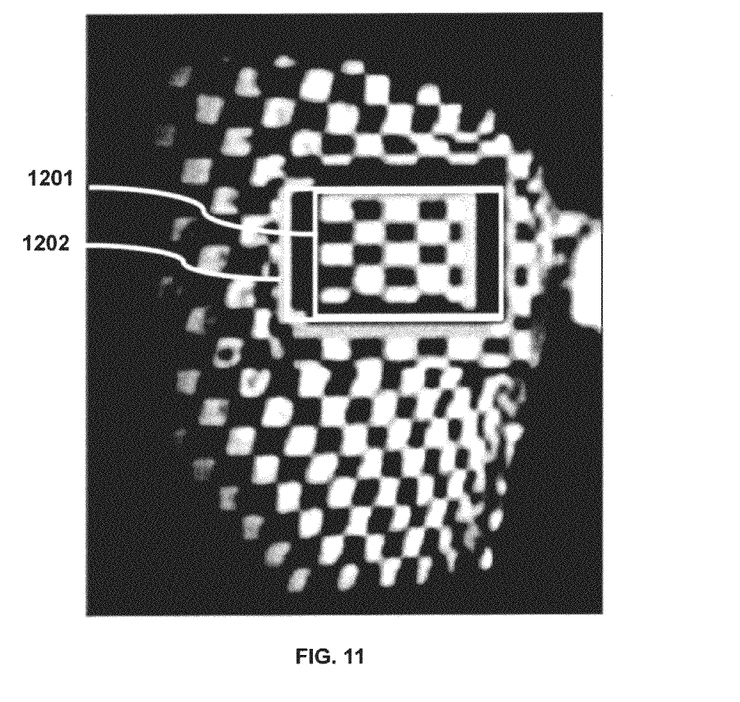

FIG. 11 shows the image with the left engine part with at least patches 1201 and 1202 which are piecewise warped. The motion norm of these patches over 400 images is illustrated in graphs in FIG. 12. FIG. 13 shows the image with the right engine part with at least patches 1401 and 1402 which are also piecewise warped. The motion norm of these patches over 400 images is illustrated in graphs in FIG. 14. The area inside the patches in FIGS. 11 and 13 clearly demonstrate the warped pattern to a square pattern compared to the outside of the patch borders. One can also observe that that the variance of the motion norm for different patches is very small. This enables the relative accurate tracking of motions of an engine part and the direct comparison of the motion of two or more objects in an image by applying the warping approach to multiple objects in an image as illustrated in FIG. 1.

Figure 12:
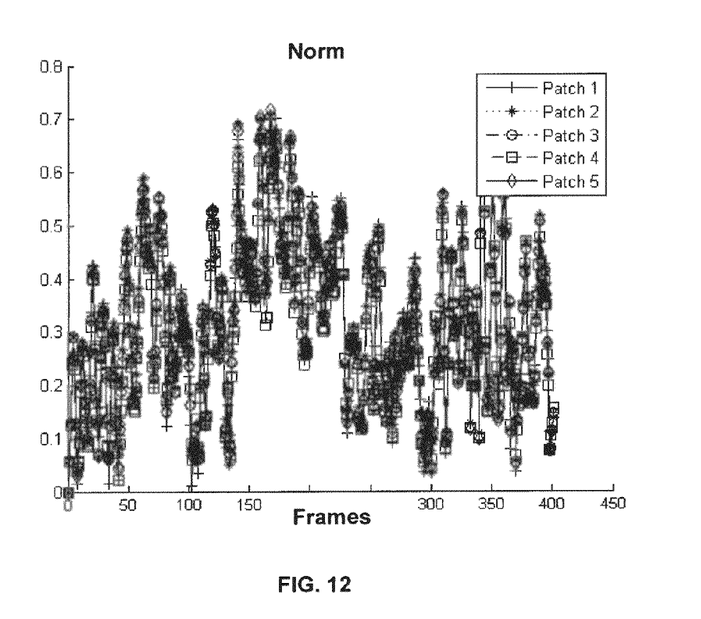
FIG. 12 illustrates tracking of a warped patch in accordance with an aspect of the present invention.
Figure 13:
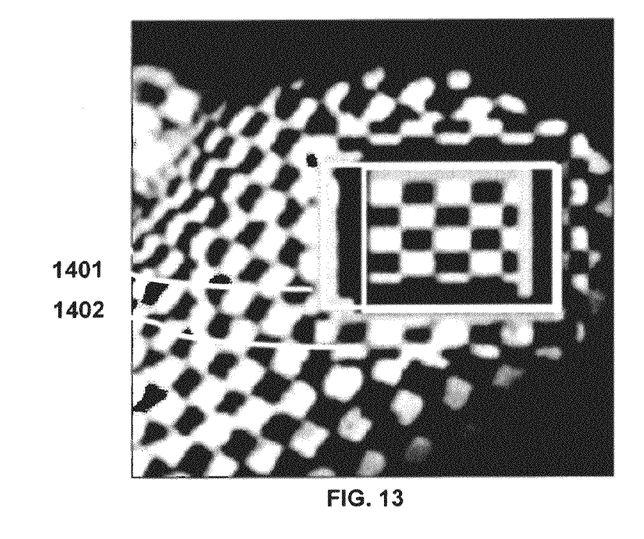
FIG. 13 illustrates image warping in accordance with various aspects of the present invention.
Figure 14:
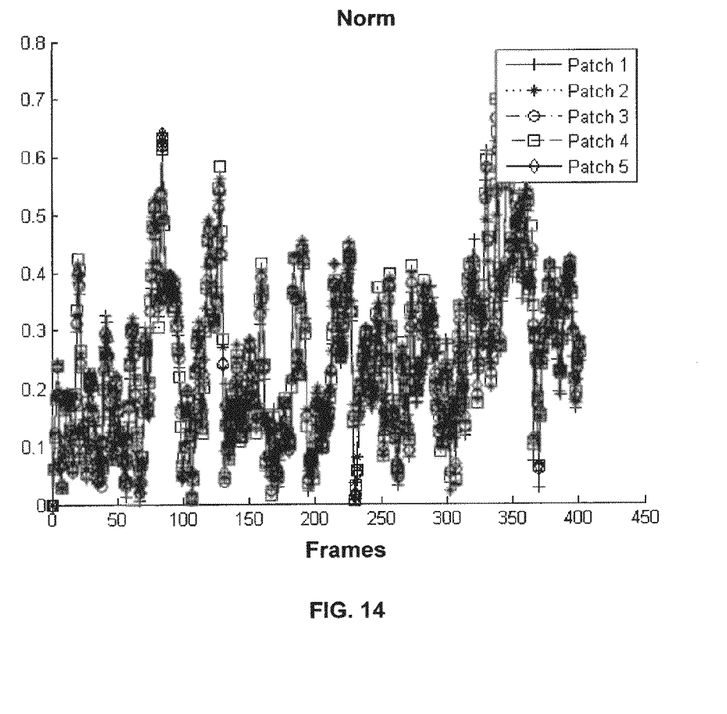
FIG. 14 illustrates tracking of a warped patch in accordance with an aspect of the present invention.

In one embodiment of the present invention, only when at least a number of adjacent patches exhibit consistent motion as shown in FIGS. 12 and 14, for instance, is a tracking result considered to be reliable.

In accordance with an aspect of the present invention, SSD-based tracking is performed on geometry corrected image sequences. From graphs in FIGS. 12 and 14 it was observed that the variance of the motion norm between different patches is very small. This suggests that for the geometry corrected sequence the SSD tracking is not location sensitive and captures the true motion of the engine part. Because of the warping, motion vectors in the image can be directly converted to metric such as millimeter. As a result, independent motion of the left and right engine parts can be analyzed and compared.

Figure 15:
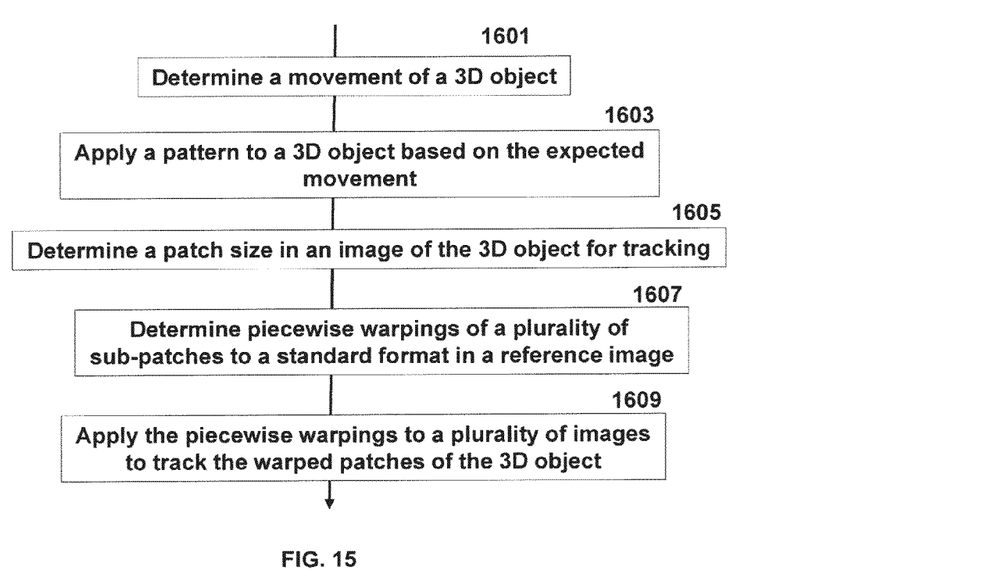
FIG. 15 illustrates steps performed in accordance with various aspects of the present invention.

FIG. 15 summarizes some of the steps provided in accordance with various aspects of the present invention. In step 1601 a movement of a 3D object is determined to determine the desired dimensions of the pattern on the object. In step 1603 the pattern is applied to the object, which is for example a machine part in a hot turbine. In step 1605 a patch size and location is determined on the image of the 3D object that is tracked in an image. In step 1607 a piecewise warping is determined for each of a plurality of sub-patches to warp a sub-patch to a standard format. In one embodiment of the present invention such a standard format is a square with its sides along the x and y axes of the image frame. The warpings are determined in a reference frame taken by a camera and applied to the patches in following images taken by the camera in step 1609 to track the warped patches to calculate a movement of the machine part by applying a tracking technique such as Sum of Square Difference (SSD) tracking technique to the warped patches. By applying the piecewise warping, local image distortions caused by hot gases are addressed.

Thus, in accordance with various aspects of the present invention, first a geometry correction is performed on a first or reference image. After that a 3D motion of a target represented in the image is very well approximated by a 2D translation in the corrected image. Several other methods have been tried for more general motion models (including warping as is known in the art). It was observed that these more general motion models don't provide significant further information, while often requiring greater computing efforts. Accordingly, in accordance with an aspect of the present invention the measured motion at every pixel is a 2D vector (dx, dy) determined from the corrected images. This is solved using SSD (Sum of Squared Difference), which is a known method.

At least one unexpected result is that a relatively simple correction of at least an area in a series of images related to a moving object in 3D space allows the 3D movement of the object which involves at least a rotation of the object to be successfully determined or approximated by a translation of pixels in the corrected images. The actual speed and frequency of the movement of the object can be approximated by image analysis of the corrected images with subpixel accuracy.

Figure 16:
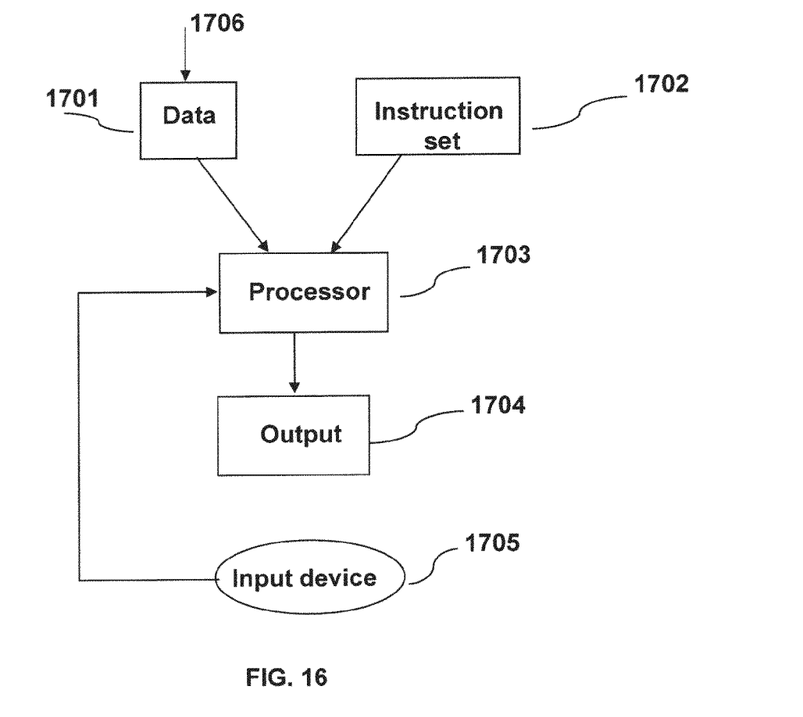
FIG. 16 illustrates a processor based system in accordance with an aspect of the present invention.

The methods as provided herein are, in one embodiment of the present invention, implemented on a system or a computer device. Thus, steps described herein are implemented on a processor, as shown in FIG. 16. A system illustrated in FIG. 17 and as provided herein is enabled for receiving, processing and generating data. The system is provided with data that can be stored on a memory 1701. Data may be obtained from a sensor such as a camera for instance an IR high-speed camera or from any other data relevant source. Data may be provided on an input 1706. Such data may be image data or any other data that is helpful in a system as provided herein. The processor is also provided or programmed with an instruction set or program executing the methods of the present invention that is stored on a memory 1702 and is provided to the processor 1703, which executes the instructions of 1702 to process the data from 1701. Data, such as image data or any other data triggered or caused by the processor can be outputted on an output device 1704, which may be a display to display images or a data storage device. The processor also has a communication channel 1707 to receive external data from a communication device and to transmit data to an external device. The system in one embodiment of the present invention has an input device 1705, which may include a keyboard, a mouse, a pointing device, one or more cameras or any other device that can generate data to be provided to processor 1703.

The processor can be dedicated or application specific hardware or circuitry. However, the processor can also be a general CPU, a controller or any other computing device that can execute the instructions of 1702. Accordingly, the system as illustrated in FIG. 17 provides a system for processing data resulting from a camera or any other data source and is enabled to execute the steps of the methods as provided herein as one or more aspects of the present invention.

In accordance with one or more aspects of the present invention methods and systems for tracking a movement of a 3D object in 3D space from image data generated by a camera wherein part of the image data is warped to a standard format have been provided.

Thus, novel systems and methods and steps implementing the methods have been described and provided herein.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method to track a 3D object in a plurality of images, comprising: providing a predetermined pattern on the 3D object;
   identifying a patch containing at least part of the predetermined pattern on the 3D object in a reference image in the plurality of images;
   determining a plurality of sub-patches in the patch;
   for each of the plurality of sub-patches in the patch, warping a captured part of the predetermined pattern to a standard format image shape;
   determining an image area inside the patch in a second image;
   applying the warping by a processor to image data of the second image inside the patch; and
   determining by the processor a movement of the 3D object from the reference image and the second image.

2. The method of claim 1, wherein the movement is determined by applying Sum of Square Difference (SSD) tracking to the reference and second images.

3. The method of claim 1, wherein the 3D object is part of a turbine moving in an atmosphere with a temperature greater than 400 degrees F.

4. The method of claim 1, wherein the predetermined pattern is a checkerboard pattern.

5. The method of claim 1, wherein the standard format image shape is a square.

6. The method of claim 1, wherein the patch covers about 3600 pixels.

7. The method of claim 1, wherein the movement of the 3D object includes a vibrational movement of a frequency greater than 100 Hz.

8. The method of claim 1, wherein the 3D object experiences a circumferential movement about an axis and a translational movement along the axis.

9. The method of claim 1, wherein the plurality of images is generated with an infra-red image sensor.

10. The method of claim 1, wherein the warping is determined by a 2.times.2 projective transformation of each image element in a sub-patch to an image element in a corrected image.

11. A system to track a 3D object in a plurality of images, comprising:
    a memory enabled to store data including instructions;

a processor enabled to execute instructions to perform the steps:
- identifying a patch containing at least part of a predetermined pattern on the 3D object in a reference image in the plurality of images;
- determining a plurality of sub-patches in the patch;
- for each of the plurality of sub-patches in the patch, warping a captured part of the predetermined pattern to a standard format image shape;
- determining an image area inside the patch in a second image;
- warping image data of the second image inside the patch; and
- determining a movement of the 3D object from the reference image and the second image.

12. The system of claim 11, wherein the movement is determined by applying Sum of Square Difference (SSD) tracking to the reference and second images.

13. The system of claim 11, wherein the 3D object is part of a turbine moving in an atmosphere with a temperature greater than 400 degrees F.

14. The system of claim 11, wherein the predetermined pattern is a checkerboard pattern.

15. The system of claim 11, wherein the standard format image shape is a square.

16. The system of claim 11, wherein the patch covers about 3600 pixels.

17. The system of claim 11, wherein the movement of the 3D object includes a vibrational movement of a frequency greater than 100 Hz.

18. The system of claim 11, wherein the 3D object experiences a circumferential movement about an axis and a translational movement along the axis.

19. The system of claim 11, wherein the plurality of images is generated with an infra-red image sensor.

20. The system of claim 11, wherein the warping is determined by a 2.times.2 projective transformation of each image element in a sub-patch to an image element in a corrected image.

* * * * *